Figure 2:
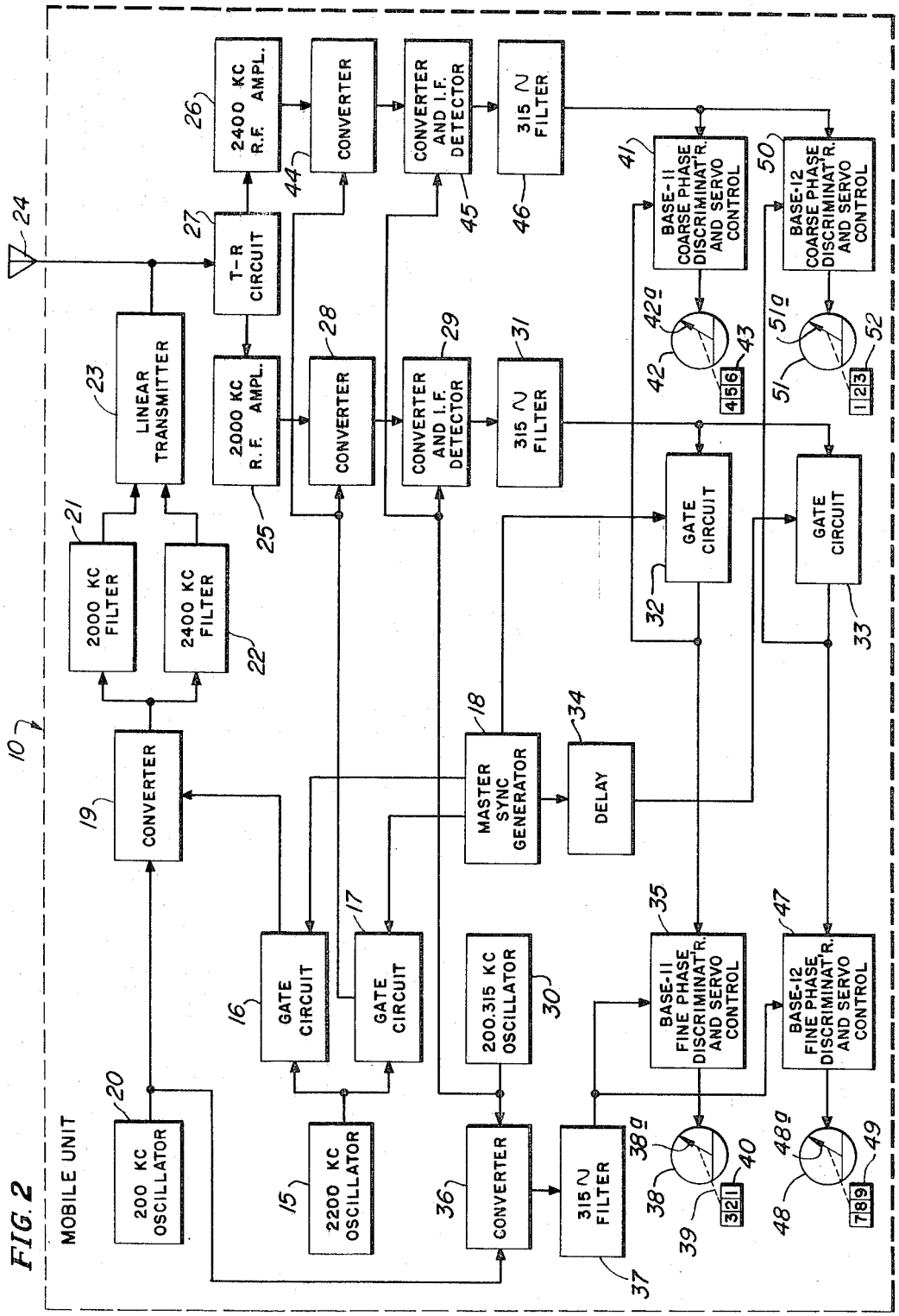

Feb. 7, 1967    E. H. MAHONEY ETAL    3,303,499
RADIO LOCATION RANGING SYSTEM
Filed Oct. 2, 1963    3 Sheets-Sheet 1
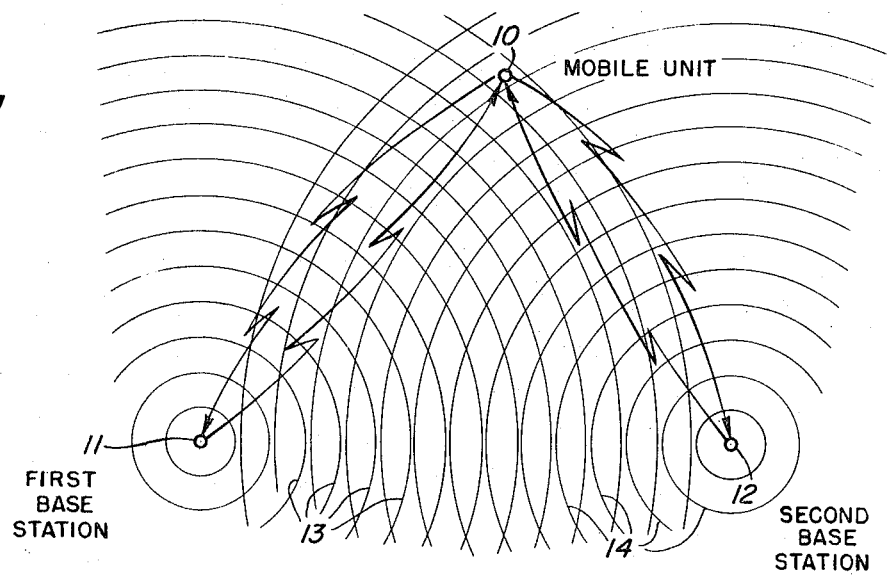
FIG. 1
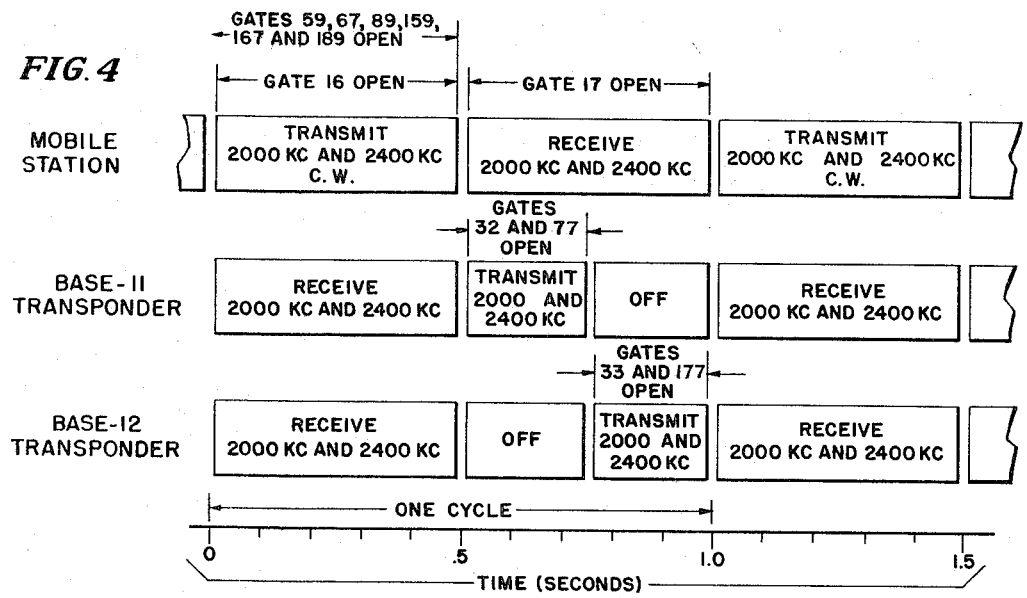
FIG. 4
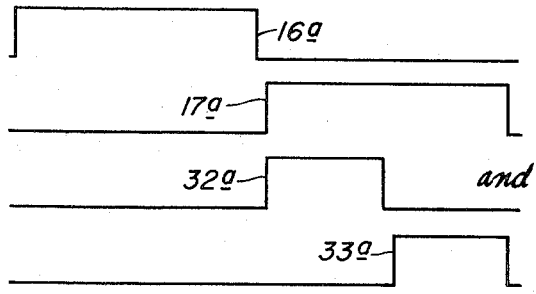
OPERATING SEQUENCE
INVENTORS
Edward H. Mahoney
and James E. Hawkins
BY Mason, Kolehmainen,
Rathburn and Wyss
ATTORNEYS

United States Patent Office 3,303,499
Patented Feb. 7, 1967

3,303,499
RADIO LOCATION RANGING SYSTEM
Edward H. Mahoney, Tulsa, and James E. Hawkins, Broken Arrow, Okla., assignors to Seismograph Service Corporation, Tulsa, Okla., a corporation of Delaware
Filed Oct. 2, 1963, Ser. No. 313,255
32 Claims. (Cl. 343—15)

The present invention relates generally to radio position finding systems and, more particularly, to new and improved radio location systems of the type employing phase comparison between signals radiated from a mobile receiving point and signals arriving at that point from one or more transmitting or transponding stations each of which receives the radiations from the mobile point and retransmits signals phase locked to the received signals. The phase comparison provided at the mobile point is effective to provide indications from which the location of the mobile point relative to the known positions of the transmitting points may be determined.

In systems of the particular type referred to each of the fixed transponding stations is effective to radiate waves, the phase relationship of which, when received at the mobile unit and when compared with the phase of the signals originally transmitted from the mobile unit, changes as a function of the changing position of the mobile unit with respect to each of the fixed transmitting stations.

More specifically, the waves radiated by each of the transponding stations in the system are characterized by isophase lines which are circular in contour about the transmitting point as the center. On a line extending radially from the point of location of the transmitter these isophase lines are spaced apart a distance equal to one half wave length of the radiated waves. With this system arrangement, the position of a mobile point relative to a pair of circular isophase lines may be determined by measuring the phase relationship between continuous waves generated at the receiving point and continuous waves received at the mobile point following retransmission from one of the fixed transponders. The distance between the adjacent isophase lines may be referred to as a lane. Since the point of location of the receiving point is not completely identified by a single phase measurement, it becomes necessary to employ at least two spaced transmitters, the two transmitters cooperating to provide a grid-like pattern of intersecting isophase lines in order to obtain a position fix or an absolute determination of the position of the mobile unit.

Systems of the character described are extremely accurate insofar as the position indications produced at the mobile unit are concerned. To obtain the desired indication accuracy, however, it is necessary to maintain phase synchronization between the continuous waves radiated by each of the transponding stations and the associated continuous wave generating means at the mobile station or, in the alternative, to employ some means for eliminating the phase shifts which may occur as a result of varying conditions other than the changing position of the mobile station. In addition, it is desirable that the frequency of the waves radiated by the mobile station and the fixed transponder stations be located adjacent the broadcast band or at least below the ultra high frequency band in order to obviate the problem of line of sight transmission. This, of course, necessitates the location of the channel frequencies of the transmitters in the most crowded portion of the frequency spectrum, at least insofar as operations in the United States are concerned. Since the frequency allocations in this band must be reduced to a minimum, it is desirable to maintain the operating frequencies of the spaced transponding stations and the signal from the mobile station within a single channel allocation.

Another problem encountered in the operation of continuous wave systems is that of eliminating ambiguity from the phase measurements which provide the desired position information. Thus, while the two phase measurements identify the position of the mobile unit relative to two intersecting circular isophase lines, they do not indicate the particular pair of lines to which the indications are related. This means that in operating the system the geographic location of the mobile unit must be known at the start of movement of the mobile unit relative to the fixed transponder stations and furthermore that the successive lanes must be counted as the mobile unit is moved relative to the grid-like pattern of circular lines. It also means that a mobile craft entering the radiation pattern of the transmitting stations cannot utilize the radiated signals to obtain a position fix without employing auxiliary equipment to determine the approximate position of the craft relative to the signal transmitters.

It is an object of the present invention, therefore, to provide an improved radio position finding system of the continuous wave type described which is free of phase synchronization difficulties and in which the above mentioned disadvantages pertaining to ambiguity are entirely obviated.

It is another object of the present invention to provide a radio position indicating system of the above character in which the number of channel frequencies employed is minimized.

It is a further object of the present invention to provide a radio position finding system employing a minimum number of channel frequencies while at the same time simplifying the receiving and transmitting apparatus required.

It is another object of the present invention to provide an improved radio location system of the continuous wave type described above which is free of phase synchronization difficulties and in which certain of the position indications obtained have sensitivities, insofar as the spacing of the isophase lines is concerned, hereinafter referred to as phase sensitivity, differing from the phase sensitivity normally determined by the frequencies of the radiated waves.

Still another object of the present invention is to provide a radio position finding system of the character described above in which new and improved means are provided for obtaining non-ambiguous position indications.

It is a still further object of the invention to provide a radio position finding system of the character described above in which a plurality of low phase sensitivity position indications and high phase sensitivity position indications are obtained, the low phase sensitivity indications beng effective to locate the range of the high phase sensitivity indications and being characterized by widely spaced phase coincidences and the high phase sensitivity indications being characterized by closely spaced phase coincidences for accurately locating the position of the mobile unit.

It is likewise an object of the present invention to provide a radio position determining system of the character described above wherein high phase sensitivity and low phase sensitivity indications are obtained while employing carrier frequencies suitable for efficient long range propagation.

Also an object of the present invention is to provide improved receiving equipment for use in radio position finding systems of the character indicated above.

An additional object of the present invention is to provide improved transmitting apparatus for use in radio position finding systems of the character described.

The invention has for a further object the provision of a new and improved radio location system of the character described above employing a time sharing arrangement to permit the transponding stations to radiate their signals at different times from each other and from the signals radiated from the mobile station but at the same time eliminating the necessity for radiating a separate synchronizing signal to coordinate the operation of the mobile station and the transponding station.

The invention has for a further object the provision of a radio location system of the character described above wherein the number of switch-over periods during which undesired transient signals are radiated is reduced to a minimum thus improving the efficiency of the system operation.

Figure 3:
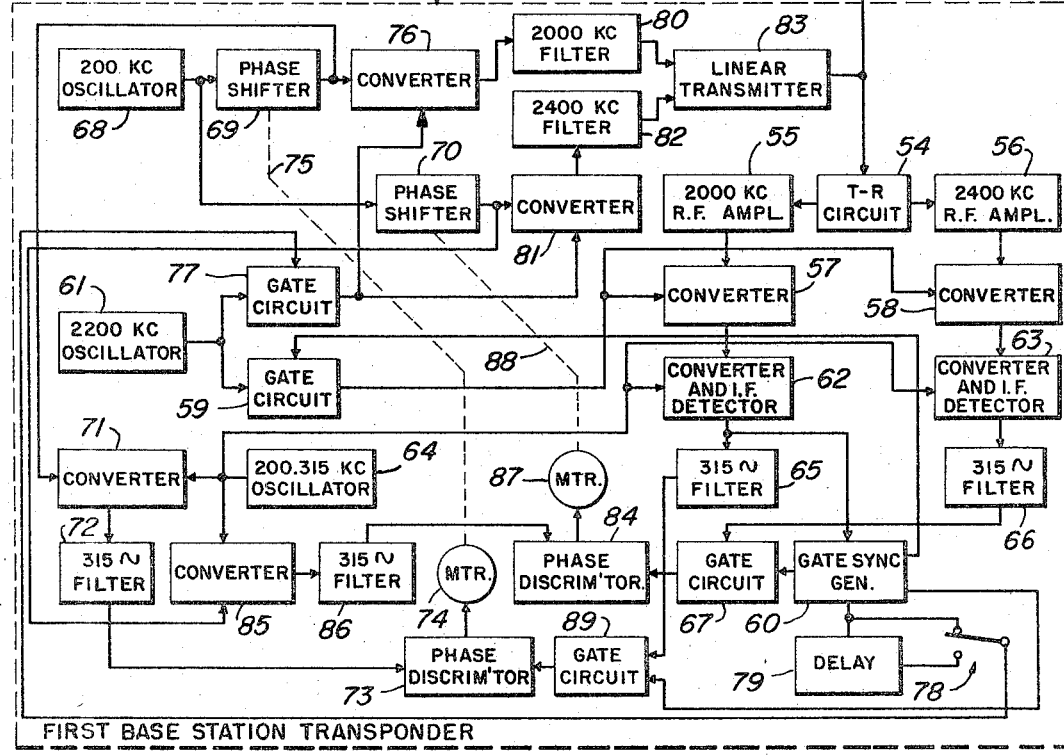
Figure 3A:
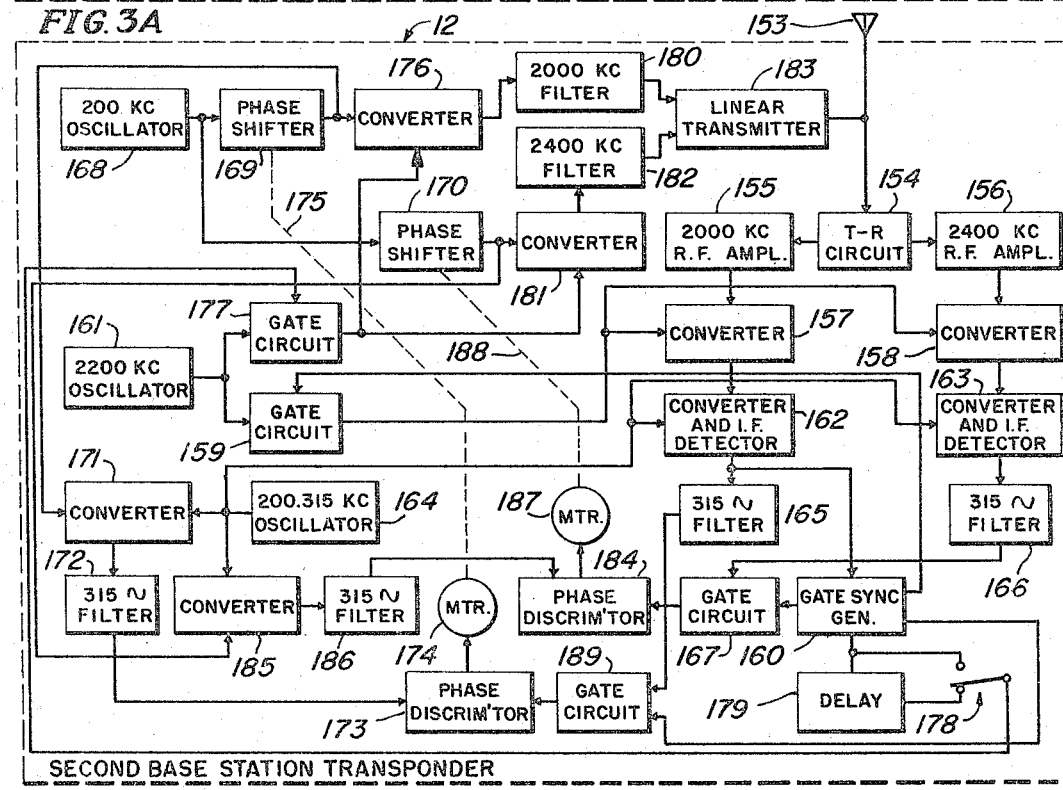

The invention, both as to its organization and its manner of operation, together with further objects and advantages, will best be understood by reference to the following detailed description taken in conjunction with the accompanying drawings wherein:

FIG. 1 is a schematic diagram representing a pair of spaced apart, fixed transponding stations and a mobile unit whose position is to be determined relative to two sets of circular isophase lines respectively centered at the two transponding stations and effectively produced in space by the signals radiated from the system stations;

FIG. 2 diagrammatically illustrates the transmitting and receiving equipment employed at the mobile unit illustrated in FIG. 1;

FIG. 3 diagrammatically illustrates the equipment provided at one of the two transponding stations of the system illustrated in FIG. 1;

FIG. 3A diagrammatically illustrates the equipment provided at the other transponding station of the system illustrated in FIG. 1; and FIG. 4 is a chart showing the operating sequence of the three stations shown in FIGS. 1, 2, 3 and 3A to permit the time sharing and the utilization of a minimum number of channel frequencies.

Referring now to the drawings and particularly to FIG. 1 the invention is there illustrated as embodied in a two center point continuous wave system for radiating signals to establish a grid-like pattern of circular isophase lines in order to provide position information at a mobile unit 10 which may be carried by a vessel or vehicle operating within the radius of transmission of a pair of spaced transponder units or base stations 11 and 12. The mobile unit 10 is best shown in FIG. 2 and comprises means for radiating a pair of unmodulated, continuous wave, radio frequency signals both of which are received by each of the fixed transponder stations 11 and 12. Each transponder station comprises means for receiving the two signals radiated from the mobile unit and for retransmitting two carrier wave signals identical in frequency to the two signals radiated from the mobile unit but phase shifted to eliminate undesired phase shifts in the system. The sequence of operation is such that the mobile station radiates its signals during the first half of each cycle whereupon the base station 11 transmits its two signals during the next or third quarter of each cycle while the station 12 transmits its two signals during the fourth or final quarter. The two signals radiated from each transponder station are received at the mobile unit 10 and are phase compared with the signals transmitted from the mobile unit to provide the position indications referred to above.

The transmitting equipment at the mobile unit 10 comprises an oscillator or signal generator 15 for developing continuous wave signals at a predetermined frequency. While the particular frequency of the signals is unimportant insofar as the system operation is concerned, the various units have been assigned frequencies to facilitate the description. Moreover, as was indicated above, it is desirable that the frequencies employed be in the radio frequency range or at least below the ultra high frequency band in order to avoid the problems incident to line of sight transmission. Thus, the signals generated by the oscillator 15 have been assigned a frequency of 2200 kilocycles. The oscillator 15 is crystal controlled so that the frequency of the signals developed is highly stable. The output from the oscillator 15 is applied to a pair of conventional gate circuits 16 and 17 each controlled by a master sync generator circuit 18 which controls the timing for the entire system. This master sync generator may comprise any well known form of timing circuit such as a motor driven set of switches or a ring counter or multivibrator chain for developing square wave gating signals at spaced intervals. In any event, the construction of the master sync generator 18 is such that the gate circuit 16 is opened during the first half of each cycle while the gate circuit 17 is closed during this period. With the gate circuit 16 open the signals developed by the oscillator 15 are applied to a conventional converter circuit 19 which is also continuously excited by signals of 200 kilocycles developed by a crystal controlled oscillator or signal generator 20. The converter 19 mixes or heterodynes the two excitation signals to develop the sum and difference frequencies as well as the applied signals. The output of the converter 19 is applied to a pair of conventional band pass filters 21 and 22 one of which, the filter 21, is designed to pass the difference frequency but to reject all of the other signals at the output of the converter while the other of which, the filter 22, is adapted to pass the sum frequency but to reject all of the remaining signals developed by the converter. The two signals passed by the filters 21 and 22 are applied to a linear transmitter circuit 23 comprising a linear mixer, a power amplifier and an antenna coupler which supply the signals from the filters 21 and 22 to the radiating antenna 24 without mixing them or developing intermodulation components in a manner which is described in detail in U.S. Patent No. 2,872,676, issued to William R. Hunsicker and assigned to the same assignee as the present invention. Thus, as long as the gate circuit 16 is open the mobile unit is effective to radiate two unmodulated, continuous wave signals having frequencies of 2000 kilocycles and 2400 kilocycles respectively. The construction of the master sync generator 18 is such that the gate 16 remains open for approximately one-half of the complete cycle of operation. To facilitate the description it will be assumed that a complete cycle of operation requires one second and, hence, the gate circuit 16 remains open for a period slightly less than one-half second. This is accomplished by the circuit 18 generating a square wave signal 16a, shown in FIG. 4, which is applied to the gate 16 to open the latter gate and hold it open throughout the duration of the square wave.

The mobile unit 10 is adapted during the second half of each cycle to receive the two signals radiated by each of the transponder stations 11 and 12. The two signals radiated from the station 11 are received during the third quarter of the cycle and phase measurements are made during this interval to provide indications of the position of the mobile unit relative to the station 11. The two signals radiated by the station 12 are received during the fourth quarter of the cycle at which time indications are provided to identify the position of the mobile unit relative to the latter station. The receiving equipment comprises a first sharply tuned RF amplifier section 25 which accepts the 2000 kilocycle signal received from each base station but is sufficiently selective to reject the 2400 kilocycle signal. The receiving equipment further comprises a second sharply tuned RF amplifier section 26 for receiving the 2400 kilocycle signal received from each transponder station but rejecting the 2000 kilocycle signal.

A transmit-receive circuit 27 of conventional construction is connected between the amplifier sections 25 and 26 and the antenna 24 to isolate the receiving equipment from the transmitting equipment in order to prevent the high power signals developed by the transmitter 23 from damaging the receiving circuits. The output of the amplifier channel 25 is applied to a converter or mixer circuit 28 while the output of the channel 26 is applied to another converter 44. During the second half of each cycle these two converters are supplied with local oscillator signals of 2200 kilocycle signals developed by the oscillator 15 and passed through the gate circuit 17. In this connection it should be observed that the master sync generator 18 is effective to close the gate circuit 16 after a period of slightly less than one-half second following the beginning of the cycle. After a short off period during which no signals are radiated the gate circuit 17 is turned on by application thereto of a square wave 17a shown in FIG. 4, thereby to apply the output of the oscillator 22 to the converts 28 and 44 thus rendering the two receiving channels effective only during the second half of the cycle. The short off period permits a small tolerance in the timing of the various units and, at the same time, prevents transient or spurious signals developed during the switching period from adversely affecting the system operation. The converter 28 heterodynes the two signals applied to its two sets of input terminals and develops a 200 kilocycle IF signal which is applied to a converter and IF detector strip 29. The latter strip is also continuously supplied with signals having a frequency of 200.315 kilocycles developed by a crystal controlled oscillator 30. The converter at the input of the strip 29 is effective to heterodyne the 200.315 kilocycle signal from the oscillator 30 and the 200.000 kilocycle IF signal from the converter 28 in order to develop a 315 cycle difference signal which is detected and amplified in the channel 29. This 315 cycle signal is passed through a band pass filter 31 which is effective to reject all of the other signals developed by the converter channel 29. The 315 cycle signal passed by the filter 31 is applied to a pair of gate circuits 32 and 33 which are controlled by the master sync generator 18. The gate circuit 32 is opened simultaneously with the gate circuit 17 by a square wave 32a and remains open for approximately one-quarter of a second. The gate 32 controls a pair of measuring circuits providing indications of the position of the mobile unit 10 relative to the base station 11 and, hence, these circuits are effective only during the period when the latter station is transmitting. A delay circuit 34 is interposed between the master sync generator 18 and the gate circuit 33 so that the latter circuit does not open with the gate circuit 32. Instead the delay circuit is constructed and arranged to provide a time delay for the wave 32a slightly greater than one-quarter second. The output of the delay circuit thus approximates the wave 33a shown in FIG. 4 and is applied to the gate circuit 33 which opens shortly after the gate circuit 32 is closed and remains open for approximately one-quarter of a second. During this period the transponder station 12 is transmitting and the gate circuit 32 controls a pair of measuring channels providing indications of the position of the mobile unit relative to the latter station. With the gate circuit 32 open the 315 cycle signal from the filter 31 is passed to one set of signal input terminals of a phase discriminator and servo-control circuit 35. The latter circuit compares the phase of the signal from the gate 32 with a 315 cycle reference signal developed at the mobile unit 10. The 315 cycle signal from the gate 32 varies in phase as a function of the position of the mobile unit 10 relative to the transponder station 11 but the phase of the locally developed 315 cycle reference signal does not vary as a function of the changing position of the mobile unit. The 315 cycle reference signal is developed by a converter or mixer 36 which continuously heterodynes the output of the 200 kilocycle oscillator 20 with the output of the 200.315 kilocycle oscillator 30. The 315 cycle difference frequency between the two heterodyned signals is passed through a band pass filter 37 and is applied to the second set of input terminals of the phase discriminator and servo-control circuit 35. The filter 37 is, of course, effective to reject all of the other signals developed by the converter 36. The circuit 35 compares the phases of the two 315 cycle signals applied to its respective sets of input terminals and developes a D.C. control signal whenever these two applied input signals differ in phase. The D.C. control signal drives a resolver in a manner described in detail in U.S. Patent No. 2,551,211 issued to James E. Hawkins and Beverly W. Koeppel and assigned to the same assignee as the present invention. The resolver has its rotor connected to drive the pointer of a phase meter 38 which provides a continuous indication of the phase relationship between the two 315 cycle signals applied to the input terminals of the discriminator 35. The indicator 38 has a pointer 38a cooperating with a fixed dial or graduated scale to provide the phase indication. As will be described more fully, hereinafter the gate circuit 32 is open during the period when the transponder station 11 is transmitting and, hence, the indicator 38 provides phase indications representing the position of the mobile unit relative to the latter station. Thus, if the mobile 10 moves along a line extending radially outward from the station 11 the indicator 38a will make a complete revolution when the mobile unit traverses a distance equal to one half wave length of the 2000 kilocycle signal. The indicator 38a cooperates with the graduated scale to provide an indication of the position of the mobile unit relative to circular isophase lines 13 shown in FIG. 1 having their centers at the station 11 and spaced apart by one half wave of the 2000 kilocycle signal. The distance between the circular isophase lines is conventionally referred to as a lane. Thus, when the pointer 38a is driven through a complete revolution the mobile unit has moved through one lane of the circular isophase lines centered at the station 11 and indicated by the reference numeral 13 in FIG. 1. In order to provide an indication of the particular lane within which the mobile unit is located the pointer 38a is connected to a mechanical drive indicated by the broken line 39 to drive integrating counters 40 for registering the number of complete revolutions of the pointer 38a. Thus, each revolution of the counter 38a is effective to either add or subtract a digit from the counter 40 depending, of course, upon whether the mobile unit is approaching or moving away from the base station 11. The meter 38 and its counter 40 may provide indications in terms of lanes and fractions of lanes or in the alternative, since each digit on the counter 40 represents a fixed distance the meter and the counter may be constructed to provide indications directly in terms of distance of the mobile unit from the station 11.

The 315 cycle signal passed through the gate circuit 32 is also applied to one set of signal input terminals of a phase discriminator and servo-control circuit 41 which is effective to drive the pointer 42a of an indicator or meter 42. The circuit 41 is similar to the circuit 35 and its associated indicator 42 also has its pointer 42a connected to drive an integrating counter 43 for a purpose which will become apparent as the description proceeds. The phase discriminator and servo-control circuit 41 compares the phase of the 315 cycle signal from the gate circuit 32 with a similar signal to be developed in response to the 2400 kilocycle signals from the RF channel 26. More specifically, the 2400 kilocycle signals from the channel 26 are passed through a converter or mixer 44, which is also excited by the 2200 kilocycle signals developed by the oscillator 15 and passed through the gate circuit 17 whenever the latter gate circuit is open. The converter 44 heterodynes the applied signals and develops the usual sum and difference frequencies plus the two applied input signals but only the 200 kilocycle difference signal is passed to a converter and IF detector strip 45. The latter strip is also supplied with the 200.315 kilocycle signals from the oscillator 30 and, hence, it is effective to develop 315 cycle difference between the latter signal and the 200 kilocycle signal from the converter 44 which 315 cycle signal is passed to a band pass filter 46. The latter filter is effective to reject all of the other signals developed by the strip 45 but the 315 cycle signal is passed to the second set of signal input terminals of the phase discriminator and servo-control circuit. The latter circuit compares the phase of the 315 cycle signal from the filter 46 with the 315 cycle signal from the gate circuit 32 and drives the pointer 42a whenever there is a difference in phase between these two applied input signals. As was described above, the signal passed by the gate circuit 32 changes as a function of the position of the mobile unit relative to the base station 11. The 315 cycle signal passed by the filter 46 changes in phase at a rate which is determined by change in phase of the 2400 kilocycle signals passed by the channel 26. During the period when the base station 11 is transmitting, the phase of the 2400 kilocycle signal is determined by the position of the mobile unit 10 relative to the transponder station 11. If the phase of the latter signal were measured it would provide an indication of the position of the mobile unit relative to circular isophase lines centered at the station 11 but spaced somewhat closer together than the spacing of the circular isophase lines 13 related to the 2000 kilocycle signal. Thus, the phase of the signal passed by the filter 46 changes somewhat more rapidly than the phase of the signal passed by the filter 31. Due to the ratios of the frequencies involved the rate of change of phase of the signals passed by the filter 46 is 1.2 times that of the signal passed by the filter 31. When these two changing signals are applied to the phase discriminator and servo control circuit 41 the pointer 42a is driven at a rate which is dependent upon the difference in frequency between the 2000 kilocycle signal and the 2400 kilocycle signal. Thus, this indicator pointer is driven at a rate equal to one-fifth of the rate of rotation of the pointer 38a. The indicator 42a provides a coarse position indication having low phase sensitivity to identify the position of the mobile unit 10 relative to circular isophase lines centered at the base station 11 but the latter lines have a spacing equal to one half wave length of a phantom frequency of 400 kilocycles equal to the difference between the 2000 kilocycle and 2400 kilocycle signals. Here again the pointer 42a drives the integrating counter 43 to add or subtract a digit whenever a full lane of the coarse or low phase sensitivity system has been tranversed by the mobile unit.

After the gate circuit 32 has been opened for a period of approximately one-quarter of a second the master sync generator 18 is effective to close this circuit and, hence, to render the circuits 35 and 41 ineffective. Shortly thereafter the gate circuit 33 is opened to render the measuring circuits effective during the fourth quarter of each cycle to provide indications of the position of the mobile unit relative to the second transponder station 12. Thus, the gate circuit 33 is opened during the period when the transponder station 12 is transmitting and this gate circuit is effective to pass the 315 cycle signals developed by the filter 31 to a phase discriminator and servo motor control circuit 47 which compares these signals with the 315 cycle reference signal passed through the filter 37. The phase discriminator and servo control circuit drives an indicator or phase meter 48 to provide an indication of the position of the mobile unit 10 relative to circular isophase lines 14 shown in FIG. 1 and having their center at the station 12. These isophase lines are spaced apart by one half wave length of the 2000 kilocycle signals radiated by the base station 12 and, hence, form a fine or high phase sensitivity system. The pointer 48a of the indicator 48 is mechanically connected to drive an integrating counter 49 which keeps track of the number of lanes of the fine system centered at the station 12. Here again the indications may be in terms of lanes or in terms of distance of the mobile unit from the station 12.

The 315 cycle signal from the gate circuit 33 is applied to one set of signal input terminals of a coarse phase discriminator and servo control circuit 50 the other set of signal input terminals of which is supplied with signals from the band pass filter 46. During the period when the gate circuit 33 is open, the filter 46 develops signals in response to the 2400 kilocycle signal radiation from the transponder station 12 and these signals are, in effect, phase compared with the 315 cycle signals developed from the 2000 kilocycle signals from the same sation. The circuit 50 functions like the circuit 41 described above to drive its associated indicator 51 in order to provide indications of the position of the mobile unit relative to widely spaced or low phase sensitivity circular isophase lines centered at the base station 12 and spaced apart in accordance with the phantom or difference frequency of 400 kilocycles between the 2000 kilocycle and 2400 kilocycle signals. The pointer 51a of the indicator 51 is mechanically connected to drive an integrating counter 52 to count the number of coarse lanes centered at the station 12 traversed as the mobile unit moves within the survey area. As is customary in the art, the counters 43 and 52 are initially set to provide lane counts either when the mobile unit 10 is at a known geodetic location or by using conventional ranging equipment such as radar or the like to obtain the initial lane counts when the mobile unit enters the radiation field of the base station transmitters. The resolution of the range information provided by the coarse indicator pointers 42a and 51a and their associated counters 43 and 52 is obviously less than that of the fine indicating meters 38 and 48 and their associated counters but is nevertheless sufficient to provide lane counts for the fine system. After the lane counts for the counters 53 and 52 have been initially set in the manner described above the coarse position information may be used to obtain the proper counts for the fine range counters 49 and 49 whereupon the latter counters may be manually set. The coarse system is used to locate the mobile unit within an area sufficiently small that unambiguous indications may be obtained on the fine system.

Considering next the operation of the first transponder or base station 11 and referring to FIG. 3, it will be observed that this station comprises means effective during the first half of each cycle for receiving the 2000 and 2400 kilocycle signals radiated from the mobile unit 10. More specifically, these signals are received by an antenna 53 and are applied to a pair of RF channels 55 and 56 through a transmit-receive circuit 54 like the circuit 27 described above. The RF channel 55 is sharply tuned to accept the 2000 kilocycle signal but to reject the 2400 kilocycle signal while the channel 56 is tuned to receive the 2400 kilocycle signal but to reject the 2000 kilocycle signal. The outputs of the channels 55 and 56 are respectively applied to a pair of converter circuits 57 and 58 each of which is connected to the output of a gate circuit 59. The operation of the gate circuit is controlled by a gate sync generator 60 which is, in turn, controlled by the signals received from the mobile unit 10. The gate sync circuit is so constructed that it develops a square wave gate signal to open the gate circuit 59 during the first half of the cycle. When the gate circuit 59 is open a 2200 kilocycle local oscillator signal developed by a crystal controlled oscillator or signal generator 61 is applied to both of the converters 57 and 58, each of which is designed to produce a 200 kilocycle difference frequency between the 2200 kilocycle signal from the oscillator 61 and the two RF signals respectively applied from the channels 55 and 56. Since the local oscillator signal is applied through the gate 59 only during the first half of the cycle the two receiving channels are ineffective throughout the second half. Thus, these channels are effective only when the mobile unit is transmitting and do not respond to the signals radiated by the other transponder station. The 200 kilocycle difference or IF frequencies developed by the converters 57 and 58 during the first half of the cycle are respectively applied to converter and IF detector circuits 62 and 63 each of which is also excited by signals having a frequency of 200.315 kilocycles developed by a crystal controlled oscillator 64. The circuits 62 and 63 heterodyne the signals from the oscillator 64 with the IF signals from the converters 57 and 58 to develop a pair of 315 cycle difference frequencies. A pair of band pass filters 65 and 66 respectively connected to the outputs of the circuits 62 and 63 pass the two 315 cycle difference frequency signals but, of course, reject all of the other signals from circuits 62 and 63. The signal output of the circuit 62 is also applied to the gate sync generator circuit 60 to control the operation of the latter in a manner described more fully below. The signals passed by the filters 65 and 66 are used to control the phase of the signals radiated from the station 11 in a manner described more fully hereinafter and, to this end, these signals are applied to a pair of gate circuits 67 and 89 which are controlled by the gate sync generator 60. Both of these gate circuits are open during the first half second of each cycle and, as a result, the phase control circuits perform their functions during this interval.

Briefly, the output of the gate circuit 67 is used to control the phase of the 2400 kilocycle signal radiated by the transponder station 11 while the output of the gate circuit 89 controls the phase of the 2000 kilocycle signal radiated from this station. More specifically, the transmitting equipment provided at the transponder station includes another crystal controlled oscillator 68 producing signals having a frequency of 200 kilocycles which are applied to a pair of motor driven phase shifters or goniometers 69 and 70. The output of the goniometer or phase shifter 69 is applied first to a converter or heterodyne circuit 71 which mixes this signal with the 200.315 kilocycle signal from the oscillator 64 to develop a 315 cycle locally generated reference signal. The latter signal is passed through a band pass filter 72 to a null-type phase discriminator circuit 73. The 315 cycle band pass filter rejects all of the other signals developed by the converter 71 and, hence, passes only the 315 cycle reference signal to the discriminator circuit 73 where this signal is phase compared with the 315 cycle signal passed by the filter 65. The phase discriminator 73 produces a D.C. output signal whenever there is a phase difference between the two signals applied to its opposed sets of signal input terminals and this D.C. control signal is applied to a servo motor 74 which drives the phase shifter or goniometer 69.

As was previously indicated, the output of the phase shifter 69 is also applied to a converter or mixer 76 which is connected to receive the output of the oscillator 61 through a gate circuit 77 controlled by the gate sync generator 60. The latter gate controls the transmission of signals from the base station. The control signal for the gate circuit 77 from the sync generator 60 is applied through a conventional switch 78 which, when in the position shown at the transponder station 11, applies the output of the circuit 60 directly to the gate 77. When the switch 78 is in the second or lower position shown at the transponder station 12 the output of the gate sync generator circuit 60 is passed through a delay circuit 79 before it is applied to the gate circuit 77. This difference in switch position is the only difference between the equipment provided at the two transponder stations. With the switch 78 in the position shown at the transponder station 11 the gate sync generator circuit 60 is effective to open the gate circuit 77 shortly after the interruption of signal reception from the mobile unit 10. More specifically, the gate sync generator 60 is rendered effective by the interruption of signals at the output of the channel 62 to develop a square wave signal which is applied to the gate circuit 77 a few milliseconds after the termination of signals from the channel 62. At the same time, a gating signal of approximately one half second duration is applied to the gates 59, 67 and 89 to close these normally open gates during the last half of the cycle. The latter gates revert to their normally open condition at termination of the gate signal and, hence, are open during the first half of the cycle. By triggering the two transponder stations in response to the termination of signals from the mobile station, the timing sequence of all three stations is established. The gate signal applied to the gate 77 has a duration of slightly less than 250 milliseconds and serves to open the gate 77 in order to apply the output of the oscillator 61 to the converter 76 during this quarter cycle. During this period the converter 76 mixes the 2200 kilocycle signal from the oscillator 61 with the 200 kilocycle signal developed by the oscillator 68 and phase shifted by the circuit 69, thus producing the usual heterodyne signals at its output. A 2000 kilocycle band pass filter 80 at the output of the converter 76 passes the 2000 kilocycle difference frequency between the 200 and 2200 kilocycle signals but rejects all of the remaining signals developed by the converter. During this same period the gate circuit 77 supplies the 2200 kilocycle signal output of the oscillator 61 to a second converter 81 which is also excited by 200 kilocycle signals passing through the phase shifter 70. The converter 81 produces the usual sum and difference frequencies plus the two original signals but a band pass filter 82 at the output of the converter passes only the 2400 kilocycle sum frequency and rejects the remaining signals. The 2000 kilocycle signal from the filter 80 and the 2400 kilocycle signal from the filter 82 are applied to a linear transmitter 83 which is similar to the transmitter 23 described above and which is coupled to the antenna 53 to radiate simultaneously the 2000 and 2400 kilocycle signals without generating undesired signals. These two signals are radiated whenever the gate 77 is open or during the third quarter of the cycle.

The phase of the 2400 kilocycle signal is controlled by the phase shifter 70 which, in turn, is controlled by the 2400 kilocycle signals received by the channel 56 from the mobile unit during the first half of the cycle. It should be noted that the gates 59, 67 and 89 are all open throughout the first half of each cycle. The 315 cycle signal output of the filter 66 detected from the 2400 kilocycle signal from the mobile unit is applied through the open gate circuit 67 to one set of signal input terminals of a phase discriminator 84 the other set of signal input terminals of which is excited by a 315 cycle reference signal developed at the transponder station 11. The latter reference signal is developed by a converter 85 which heterodynes the 200.315 kilocycle signal from the oscillator 64 with the 200 kilocycle output of the phase shifter 70, thus producing a 315 cycle difference frequency signal which is passed by a band pass filter 86 to the phase discriminator circuit 84. The latter circuit is similar to the phase discriminator 73 described above and develops a D.C. control signal only if the two applied input signals are not in phase. The control signal drives a servo motor 87 having its output shaft connected via a mechanical drive represented by the broken line 88 to the rotor of the phase shifter or goniometer 70. The phase shifter 70 is driven by the servo motor 87 to change the phase of the signal from the filter 86 in a direction tending to reduce to zero the D.C. control signal from the circuit 84, thus locking the phase of the 2400 kilocycle signal radiated from the transponder station 11 to the phase of the 2400 kilocycle signal received at the latter station from the mobile unit 10. Therefore, the phase shifter 70 is effective to compensate for all phase shifts in the system other than those which occur as a result of changing position of the mobile unit. The 2400 kilocycle signals respectively radiated from the mobile unit 10 and the transponder station 11 are effectively phase locked.

In view of the foregoing description, it will be recognized that as soon as the gate sync generator 60 is rendered effective by the termination of 2000 kilocycle signals received from the mobile unit 10 to close the gates 59, 67 and 89 and to open the gate circuit 77 whereupon the transponder station 11 is rendered effective to radiate simultaneously two radio frequency signals of 2000 kilocycles and 2400 kilocycles. This radiation continues for approximately one-quarter of a second or 250 milliseconds following which the gate signal from the generator 60 closes the gate 77 and terminates the transmission of signals from the transponder station 11. After another quarter second during which the transponder 12 transmits its signals, the gate circuits 59, 67 and 89 are restored to their open conditions by the gate sync generator 60 to prepare the transponder station 11 for the next cycle of operation. Thus, with the gates 59, 67 and 89 open the phase correcting circuits of the transponder station 11 and the receiving circuits will be effective to utilize the signals received from the mobile unit 10 to effect the phase corrections described above during the next succeeding cycle.

It will also be observed that during the period when the transponder station 11 is transmitting the gate circuit 59 is closed so that no local oscillator signals are supplied to the converters 57 and 58, thus effectively muting the receiving equipment at the transponder station. This operation coupled with that of the transmit-receive circuit 54 prevents reception of signals by the transponder station during the period when the latter station is emitting its radio frequency signals.

The equipment provided at the transponder station 12, as was indicated above and as shown in FIG. 3A, is identical to that described above for the transponder station 11 with the sole exception that the position of the switch 178 has been changed. In this connection since the component elements making up the equipment at the transponder station 12 are identical to those used at the transponder station 11 the elements of the station 12 have been assigned reference numerals that are exactly 100 higher than the corresponding elements at the station 11. Thus, it will be observed that the switch 178 at the station 12 corresponds to the switch 78 but the movable arm of this switch is in engagement with the lower contact so that the signal from the gate sync generator 160 is effectively passed through the delay network 179 before it is applied to the gate circuit 177. The delay network 179 introduces a delay of approximately 250 milliseconds into the 250 millisecond duration gating signal produced by the gate sync generator 160 with the result that the gate 177 opens approximately 250 milliseconds later than the gate 77 at the station 11. Thus, the gate 177 prevents the transponder station 12 from emitting its two radio frequency signals until the transponder station 11 has completed its transmission. When the gate circuit 177 is open the transponder 12 is rendered effective to radiate simultaneously two radio frequency signals of 2000 and 2400 kilocycles, respectively in a manner which will be apparent in view of the description of the equipment operation at the station 11. The transmission of the signals from the station 12 continues as long as the gate circuit 177 is open or for a period of approximately 250 milliseconds. At the end of the latter period the gate signal from the delay network 179 is removed and the gate circuit 177 closes so that the transmission from the station 12 is terminated. The half second gate signals from the generator 160, however, are developed at the same time as the corresponding gate signals at the station 11 and, as a consequence, the gate circuits 159, 167 and 189 are closed during the second half of each cycle and are open during the first half. The receiving equipment and the phase correcting equipment at the station 12 thus functions in the same manner.

Turning now to the operation of the system shown in FIGS. 2, 3 and 3A and referring also to the timing chart shown in FIG. 4 where the operating sequence is illustrated, it will be observed that the complete cycle of operation may be said to begin with the simultaneous transmission of signals of 2000 and 2400 kilocycles from the mobile unit 10. This cycle, as was indicated above, is initiated by application to the gate circuit 16 of a gating signal 16a of one-half second duration from the master sync generator 18. The gate 17 is closed during the first half of the cycle so that the converters 28 and 44 receive no local oscillator signals and the TR circuit 27 is in the transmit condition. At the two transponder stations 11 and 12, the TR circuits 54 and 154 are in the receive condition to permit reception of both of the signals radiated from the mobile unit at each station.

More specifically, the gates 59, 67 and 89 at the station 11 are open and, at the same time, the gates 159, 167 and 189 at the station 12 are open. The gates 59 and 159 are, thus, effective to supply local oscillator signals from the oscillator 61 to the converters 57 and 58 at the station 11 and the converters 157 and 158 at the station 12 so that the receiving channels at both transponder stations are operative. The gate circuits 67, 89, 167 and 189 render the phase correcting circuits at the base stations operative during the first half of the cycle to perform the phase corrections in the manner described above so that both of the transponder stations are conditioned to radiate RF signals phase locked to the signals from the mobile unit as soon as the respective transmitter stations are rendered effective to perform their transmitting functions. The radiation of signals from the mobile unit 10 continues for approximately 500 milliseconds whereupon the master sync generator 18 is effective to close the gate 16 thus terminating the transmission from the mobile unit. The termination of transmission, of course, interrupts the reception at both of the transponder stations 11 and 12 and thus causes the gate sync generators 60 and 160 to develop a gating signal which is immediately effective to close the gate circuits 59, 67 and 89 at the station 11 and also to close the gate circuits 159, 167 and 189 at the station 12. These six gates remain closed for approximately one-half second and are then automatically restored to their open conditions. Thus, the receiving equipment and the phase correcting equipment at each transponder station is rendered ineffective to respond either to its own transmissions or to transmissions from the other transponder station. The gate sync generators 60 and 160 also generate their 250 millisecond gate signals in response to the termination of signal reception from the mobile unit. At the station 11 this signal is immediately applied to the gate circuit 77 to render the transponder station 11 effective to radiate simultaneously its two RF signals. This radiation continues for a period of approximately 250 milliseconds but during this period of operation the transponder station 12 is ineffective to radiate its signals due to the function of the delay circuit 179 in preventing the gate circuit 177 from opening. At the mobile unit 10 the master sync generator 18 is effective to open the gate circuit 17 soon after the gate 16 is closed thus supplying local oscillator signals to the converters 28 and 44 and rendering the receiving equipment at the mobile station effective to receive the signals from the two transponder stations. The gate circuit 17 remains open for a period of approximately 500 milliseconds or throughout the second half of the cycle. Near the beginning of the second half cycle or soon after the gate 16 closes, the master sync generator 18 supplies a gate signal 32a (FIG. 4) to open the gate circuit 32, thus rendering effective the measuring circuits for providing both the coarse and fine position indications relating to the base station 11. The latter measuring circuits are, of course, effective only during the period when the base station 11 is transmitting. To this end, the gate signal 32a has a duration of about one-quarter second and the gate 32 remains open throughout this period. Thus, during the first portion of the second half cycle the mobile unit 10 receives the two RF signals radiated from the transponder station 11 and utilizes these signals to provide a fine position indication on the indicator 38 and to provide a coarse or low phase sensitivity position indication on the indicator 42 all in the manner described above. After the transponder station 11 has been radiating its signals for a period of approximately 250 milliseconds the gate sync generator 60 no longer applies a gate signal to maintain the gate circuit 77 open and, as a result, the signal radiation from the station 11 is terminated. At the same time the gate 32 closes and the gate 33 opens as a result of the delayed gate signal from the delay circuit 34. The gate 33 renders effective the fine and coarse measuring circuits relating to the base station 12 for a period of about 250 milliseconds. At the beginning of the fourth quarter of the cycle the delay circuit 179 at the station 12 applies its 250 millisecond gate signal from the generator circuit 160 to the gate circuit 177 thus rendering the transponder station 12 effective to radiate simultaneously its two RF signals. This signal radiation continues for a period equal to the duration of the signal from the gate circuit 160 or for approximately 250 milliseconds. During the latter period the receiving equipment at the mobile unit 10 is still effective and, hence, the two signals radiated from the transponder station 12 are received and detected to provide a fine position indication appearing on the indicator 48 and a coarse or low phase sensitivity position indication on the indicator 51. As was indicated previously the latter indications identify the position of the mobile unit relative to circular isophase lines having their centers at the base station 12. After the 250 millisecond period of radiation of the transponder station 12 is completed the delay circuit 179 is no longer effective to apply a gate signal to the gate circuit 177 and, hence, the signal transmission from the station 12 is terminated. At approximately the same time the master sync generator 18 at the mobile unit closes the gate circuit 33 to render all of the phase measuring circuits at the mobile unit ineffective. Soon thereafter the master sync generator 18 is effective to apply a gating signal to reopen the gate circuit 16 thus beginning the next cycle of operation. The operation then continues in the sequence described so that the mobile unit is continuously effective to provide a first set of coarse and fine position indications on the meters 38 and 41 identifying the location of the unit relative to circular isophase lines centered at the station 11 and to provide a second set of coarse and fine position indications appearing on the indicators 48 and 51 to identify the location of the mobile unit relative to circular isophase lines centered at the station 12. The coarse or low phase sensitivity position indications appearing on the indicators 42 and 51 are effective to resolve the ambiguity of the fine position indications so that the four position indications, taken together, identify a pair of circular isophase lines intersecting at the position of the mobile unit.

While a particular embodiment of the invention has been illustrated and described it will be apparent that many modifications will readily occur to those skilled in this art and it is, therefore, contemplated by the appended claims to cover any such modifications as fall within the true spirit and scope of the invention.

What is claimed as new and desired to be secured by Letters Patent of the United States is:

1. A radio position finding system comprising a mobile unit and two fixed, spaced apart transponder stations, said mobile unit comprising means for simultaneously radiating first and second pure, unmodulated signals of predetermined frequencies in different frequency channels during spaced apart intervals, receiving and indicating equipment effective during periods between the spaced apart intervals, means for generating a reference signal having its phase locked to said first signal, and timing means for rendering the radiating means and said equipment alternately effective; each of said transponder stations including means for simultaneously radiating during said periods first and second pure, unmodulated waves having frequencies respectively equal to the frequencies of said first and second signals, means for receiving said first and second signals during said intervals, and phase adjusting means for respectively locking the phases of the first and second waves to the phases of the received first and second signals; means responsive to at least one of said first and second signals for rendering the radiating means of the two transponder stations alternately effective during said periods; the receiving and indicating equipment including means for receiving the waves radiated from each of the transponder stations and for comparing the phase of the first wave received from a first of the transponder stations with said reference signal to provide a first fine position indication representing the position of the mobile unit relative to said first station, said equipment including means jointly responsive to the two waves received from said first transponder station for providing a first coarse position indication representing the location of the mobile unit relative to said first station, said equipment including means for comparing the phase of said reference signal with the first wave received from the second of said transponder stations to provide a second fine position indication representing the location of the mobile unit relative to said second station, and means jointly responsive to the two waves received from the second station for providing a second coarse position indication representing the position of the mobile unit relative to said second station.

2. The apparatus defined in claim 1 wherein the radiating means at each of said transponder stations and the radiating means at the mobile unit each comprises first and second oscillators respectively generating different waves, means for heterodyning the waves to develop sum and difference frequencies, and means for transmitting the sum frequency and the difference frequency simultaneously.

3. The apparatus defined by claim 2 wherein the means for generating the reference signal comprises a third oscillator for producing an output and means for heterodyning said output and the wave produced by said second oscillator to develop the difference frequency therebetween.

4. The apparatus defined by claim 2 wherein said equipment includes a first converter for heterodyning the wave produced by said first oscillator with one of the signals received from each transponder station to produce first and second IF signals during the respective periods when the transponder stations are radiating, and a second converter for heterodyning the other signals received from each transponder station with the wave produced by said first oscillator to produce third and fourth IF signals during the respective periods when the transponder stations are radiating.

5. The apparatus defined by claim 4 wherein said equipment includes a third oscillator producing an output differing in frequency from each of said IF signals by a small audio difference, means for heterodyning said output and each of said first and second IF signals to develop first and second audio signals, and means for heterodyning said output and each of said third and fourth IF signals to develop third and fourth audio signals.

6. The apparatus defined by claim 5 wherein the means for generating the reference signal comprises means for heterodyning said output with the wave produced by said second oscillator to develop the difference frequency therebetween.

7. The apparatus defined by claim 5 wherein the means providing said first fine position indication comprises a phase comparison circuit for comparing the phase of said first audio signal and said reference signal and the means providing the second fine position indication comprises a phase comparison circuit for comparing the phase of said second audio signal and said reference signal.

8. The apparatus defined by claim 6 wherein the means providing said first fine position indication comprises a phase comparison circuit for comparing the phase of said first audio signal and said reference signal and the means providing the second fine position indication comprises a phase comparison circuit for comparing the phase of said second audio signal and said reference signal.

9. The apparatus defined by claim 5 wherein the means providing the first coarse position indication includes means for measuring the phase relationship between the first and third audio signals and the means providing the second coarse position indication includes means for measuring the phase relationship between the second and fourth audio signals.

10. A radio ranging system comprising a mobile unit and at least one fixed transponder station, said mobile unit comprising means for simultaneously radiating first and second pure, unmodulated signals of predetermined frequencies in different frequency channels during spaced apart intervals, receiving and indicating equipment effective during periods between the spaced apart intervals, means for generating a reference signal having its phase locked to said first signal, and timing means for rendering the radiating means and said equipment alternately effective; said transponder station including means for simultaneously radiating during each of said periods first and second pure, unmodulated waves having frequencies respectively equal to the frequencies of said first and second signals, means for receiving said first and second signals during each of said intervals, and phase adjusting means for respectively locking the phases of the first and second waves to the phases of the received first and second signals; means responsive to at least one of said first and second signals for rendering the radiating means and the receiving means at said transponder station alternately effective in synchronism with said timing means; the receiving and indicating equipment including means for receiving waves radiated from the transponder station and for comparing the phase of the first wave with said reference signal to provide a fine position indication representing the position of the mobile unit relative to said transponder station, and said equipment including means jointly responsive to the two waves received from said transponder station for providing a coarse position indication representing the location of the mobile unit relative to said transponder station.

11. The apparatus defined by claim 10 wherein the radiating means of said transponder station and the radiating means at the mobile unit each comprises first and second oscillators respectively generating different waves, means for heterodyning the waves to develop sum and difference frequencies, and means for transmitting the sum frequency and the difference frequency simultaneously.

12. The apparatus defined by claim 11 wherein the means for generating the reference signal comprises a third oscillator for producing an output and means for heterodyning said output and the wave produced by said second oscillator to develop the difference frequency therebetween.

13. The apparatus defined by claim 11 wherein said equipment includes a first converter for heterodyning the wave produced by said first oscillator with one of the signals received from said transponder station to produce a first IF signal, and a second converter for heterodyning the other signal received from said transponder station with the wave produced by said first oscillator to produce a second IF signal.

14. The apparatus defined by claim 13 wherein said equipment includes a third oscillator producing an output differing in frequency from each of said first and second IF signals by a small audio difference, means for heterodyning said output and said first IF signal to develop a first audio signal, and means for heterodyning said output and said second IF signal to develop a second audio signal.

15. The apparatus defined by claim 14 wherein the means for generating the reference signal comprises means for heterodyning said output with the wave produced by said second oscillator to develop the difference frequency therebetween.

16. The apparatus defined by claim 14 wherein the means providing said fine position indication comprises a phase comparison circuit for comparing the phase of said first audio signal and said reference signal.

17. The apparatus defined by claim 15 wherein the means providing said fine position indication comprises a phase comparison circuit for comparing the phase of said first audio signal and said reference signal.

18. The apparatus defined by claim 14 wherein the means providing the first coarse position indication includes means for measuring the phase relationship between the first and second audio signals.

19. A radio position finding system comprising a mobile unit and two fixed, spaced apart transponder stations, said mobile unit comprising means for radiating a first pure, unmodulated signal of predetermined frequency during spaced apart intervals, receiving and indicating equipment effective during periods between the spaced apart intervals, means for generating a reference signal having its phase locked to said first signal, and timing means for rendering the radiating means and said equipment alternately effective; each of said transponder stations including means for radiating during each of said periods a pure, unmodulated wave having a frequency equal to that of said first signal, means for receiving said first signal during each of said intervals, and phase adjusting means for respectively locking the phase of the wave to the phase of the received first signal; means responsive to said first signal for rendering the radiating means of the two transponder stations alternately effective during each period; the receiving and indicating equipment including means for receiving the waves radiated from the transponder stations and for comparing the phase of the wave received from a first of the transponder stations with said reference signal to provide a first position indication representing the position of the mobile unit relative to said first station, and said equipment including means for comparing the phase of said reference signal with the wave received from the second of said transponder stations to provide a second position indication representing the location of the mobile unit relative to said second station.

20. The apparatus defined by claim 19 wherein the radiating means at each of said transponder stations and the radiating means at the mobile unit each comprises first and second oscillators respectively generating different waves, means for heterodyning the waves to develop sum and difference frequencies, and means for transmitting one of the latter frequencies.

21. The apparatus defined by claim 20 wherein the means for generating the reference signal comprises a third oscillator for producing an output and means for heterodyning said output and the wave produced by said second oscillator to develop the difference frequency therebetween.

22. The apparatus defined by claim 20 wherein said equipment includes a converter for heterodyning the wave produced by said first oscillator with the wave received from each transponder station to produce first and second IF signals.

23. The apparatus defined by claim 22 wherein said equipment includes a third oscillator producing an output differing in frequency from each of said first and second IF signals by a small audio difference, means for heterodyning said output and said first IF signal to develop a first audio signal and means for heterodyning said output and said second IF signal to develop a second audio signal.

24. The apparatus defined by claim 23 wherein the means for generating the reference signal comprises means for heterodyning said output with the wave produced by said second oscillator to develop the difference frequency therebetween.

25. The apparatus defined by claim 23 wherein the means providing said first position indication comprises a phase comparison circuit for comparing the phase of said first audio signal and said reference signal and the means providing the second position indication comprises a phase comparison circuit for comparing the phase of said second audio signal and said reference signal.

26. A radio position ranging system comprising a mobile unit and a fixed transponder station, said mobile unit comprising means for radiating a pure, unmodulated signal during spaced apart intervals, receiving and indicating equipment effective during periods between the spaced apart intervals, means for generating a reference signal having its phase locked to said signal, and timing means for rendering the radiating means and said equipment alternately effective; said transponder station including means for radiating a pure, unmodulated wave during each of said periods, means for receiving said radiated signal during each of said intervals, and phase adjusting means for respectively locking the phase of the wave to the phase of the received, radiated signal; means responsive to said received, radiated signal for rendering the radiating means and the receiving means of the transponder station alternately effective in synchronism with the timing means; and the receiving and indicating equipment including means for receiving the wave radiated from the transponder station and for comparing the phase of said wave with said reference signal to provide a position indication representing the position of the mobile unit relative to said transponder station.

27. The apparatus defined by claim 26 wherein the radiating means at said transponder station and the radiating means at the mobile unit each comprises first and second oscillators respectively generating different waves, means for heterodyning the waves to develop sum and difference frequencies, and means for transmitting at least one of the latter frequencies to radiate said wave.

28. The apparatus defined by claim 27 wherein the means for generating the reference signal comprises a third oscillator for producing an output and means for heterodyning said output and the wave produced by said second oscillator to develop the difference frequency therebetween.

29. The apparatus defined by claim 27 wherein said equipment includes a first converter for heterodyning the wave produced by said first oscillator with the signal received from said transponder station to produce an IF signal.

30. The apparatus defined by claim 29 wherein said equipment includes a third oscillator producing an output differing in frequency from said IF signal by a small audio difference, and means for heterodyning said output and said IF signal to develop an audio signal.

31. The apparatus defined by claim 30 wherein the means for generating the reference signal comprises means for heterodyning said output with the wave produced by said second oscillator to develop the difference frequency therebetween.

32. The apparatus defined by claim 30 wherein the means providing said position indication comprises a phase comparison circuit for comparing the phase of said audio signal and said reference signal.

References Cited by the Examiner
UNITED STATES PATENTS

| | | | |
|---|---|---|---|
| 2,659,883 | 11/1953 | Haake | 343—15 |
| 2,705,320 | 3/1955 | Palmer | 343—12 X |
| 3,078,460 | 2/1963 | Werner et al. | 343—12 |
| 3,130,403 | 4/1964 | Granqvist | 343—12 |
| 3,199,104 | 8/1965 | Miller | 343—12 |
| 3,213,449 | 10/1965 | Kobayashi et al. | 343—12 |
| 3,223,998 | 12/1965 | Hose | 343—12 |

CHESTER L. JUSTUS, *Primary Examiner.*
P. M. HINDERSTEIN, D. C. DAUFMAN,
*Assistant Examiners.*